(12) United States Patent
Jerolm (10) Patent No.: US 11,736,318 B2
(45) Date of Patent: Aug. 22, 2023

(54) INITIALIZATION OF DATA BUS SUBSCRIBERS

(71) Applicant: WAGO Verwaltungsgesellschaft mbH, Minden (DE)

(72) Inventor: Daniel Jerolm, Bad Essen (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 160 days.

(21) Appl. No.: 16/693,964

(22) Filed: Nov. 25, 2019

(65) Prior Publication Data

US 2020/0092136 A1 Mar. 19, 2020

Related U.S. Application Data

(63) Continuation of application No. PCT/EP2018/062941, filed on May 17, 2018.

(30) Foreign Application Priority Data

May 24, 2017 (DE) ...................... 10 2017 208 818.4

(51) Int. Cl.
*H04L 12/40* (2006.01)
*G06F 9/54* (2006.01)
(Continued)

(52) U.S. Cl.
CPC ........ *H04L 12/40169* (2013.01); *G06F 9/546* (2013.01); *G06F 13/362* (2013.01);
(Continued)

(58) Field of Classification Search
CPC ... H04L 12/4016; H04L 12/403; H04L 12/42; H04L 12/423
(Continued)

(56) References Cited

U.S. PATENT DOCUMENTS 5,165,024 A * 11/1992 Sweazey ............... H04L 12/433
710/100
5,472,347 A 12/1995 Nordenstrom et al.
(Continued)

FOREIGN PATENT DOCUMENTS

CN 1196524 A 10/1998
CN 101178644 A 5/2008
(Continued)

OTHER PUBLICATIONS

Chinese Office Action dated May 31, 2021 in corresponding application 201880034529.1.
(Continued)

*Primary Examiner* — Titus Wong
(74) *Attorney, Agent, or Firm* — Muncy, Geissler, Olds & Lowe, P.C.

(57) ABSTRACT

A method for operating a data bus subscriber of a local bus, particularly of a ring bus, the method including the steps of: receiving a first data packet over the local bus, wherein the first data packet has an address of the data bus subscriber to which it is directed and at least one instructions list, having a set of instructions for processing process data, receiving a second data packet over the local bus, wherein the second data packet has process data; and executing instructions of the at least one instructions list for processing the received process data. A corresponding data bus subscriber and a local bus master is also provided.

15 Claims, 4 Drawing Sheets

(51) Int. Cl.
*G06F 13/362* (2006.01)
*H04L 12/423* (2006.01)
*H04L 41/0803* (2022.01)
*H04L 69/22* (2022.01)

(52) U.S. Cl.
CPC ........ *H04L 12/423* (2013.01); *H04L 41/0803* (2013.01); *H04L 69/22* (2013.01); *H04L 2012/4026* (2013.01)

(58) Field of Classification Search
USPC .......................................................... 710/110
See application file for complete search history.

(56) References Cited

U.S. PATENT DOCUMENTS

| | | | |
|---|---|---|---|
| 5,590,124 A * | 12/1996 | Robins | H04L 45/02 370/258 |
| 6,101,586 A | 8/2000 | Ishimoto et al. | |
| 6,496,516 B1 * | 12/2002 | Dabecki | H04L 12/42 370/413 |
| 6,510,141 B1 * | 1/2003 | Ramfelt | H04L 12/40169 370/254 |
| 6,512,966 B2 | 1/2003 | Lof et al. | |
| 6,671,585 B2 | 12/2003 | Lof et al. | |
| 8,782,771 B2 | 7/2014 | Chen et al. | |
| 9,444,757 B2 * | 9/2016 | Pekcan | H04L 49/65 |
| 2002/0172200 A1 * | 11/2002 | Shin | H04L 47/365 370/503 |
| 2003/0006613 A1 | 1/2003 | Lof et al. | |
| 2003/0167348 A1 * | 9/2003 | Greenblat | H04L 12/42 709/251 |
| 2005/0083954 A1 * | 4/2005 | Meyer-Grafe | H04L 12/403 370/403 |
| 2007/0081473 A1 * | 4/2007 | Jiang | H04L 12/40169 370/254 |
| 2007/0230484 A1 * | 10/2007 | Hu | H04L 12/40039 370/401 |
| 2008/0320582 A1 | 12/2008 | Chen et al. | |
| 2009/0265498 A1 * | 10/2009 | Yamaoka | G06F 13/364 710/305 |
| 2013/0013868 A1 * | 1/2013 | Allen | G06F 5/10 711/147 |
| 2014/0247908 A1 * | 9/2014 | Ge | G06F 7/4818 375/340 |
| 2015/0110126 A1 | 4/2015 | Edmiston et al. | |
| 2017/0093597 A1 | 3/2017 | Ranck et al. | |

FOREIGN PATENT DOCUMENTS

| | | |
|---|---|---|
| CN | 105046913 A | 11/2015 |
| KR | 101576050 B1 | 12/2015 |
| WO | WO0215517 A2 | 2/2002 |

OTHER PUBLICATIONS

International Search Report dated Jul. 5, 2018 in corresponding application PCT/EP2018/062941.
International Preliminary Report on Patentability dated Dec. 5, 2019 in corresponding application PCT/EP2018/062941.
ISO 11898-1 International Standard. :"Road Vehicles—Controller Area Network, Part 1 Data Link layer and physical signalling".
Mahmut Tenruh:"Design and Performance Analysis of Controller Area Network Cut-Through Bridges" pp. 267-272, vol. 5, No. 4, 2002, XP055844973.
Morel et al; "Requirements for Wireless Extensions of a FIB Fieldbus", Swiss Federal Institute of Technology, 1996 IEEE.
Tanenbaum et al; Computer Networks (5th Edition), Prentice Hall, US XP055509873, pp. 1-962 (2011).

* cited by examiner

INITIALIZATION OF DATA BUS SUBSCRIBERS

This nonprovisional application is a continuation of International Application No. PCT/EP2018/062941, which was filed on May 17, 2018, and which claims priority to German Patent Application No. 10 2017 208 818.4, which was filed in Germany on May 24, 2017, and which are both herein incorporated by reference.

BACKGROUND OF THE INVENTION

Field of the Invention

The present invention relates to the initialization of data bus subscribers, and more specifically to the programming of data bus subscribers of a ring bus by means of instruction lists.

Description of the Background Art

Data bus subscribers are usually found in automation systems. A data bus subscriber serves to control or monitor a process of an automation system. This is done by issuing control signals, for example, to actuators and/or by receiving measurement signals such as sensors of the automation system.

Automation systems are used in particular for the control of industrial installations, buildings and means of transport. For the control of an automation system usually several sensors and actuators are necessary. These monitor and control the process performed by the system. The different sensors and actuators of an automation system are often referred to as automation devices.

These automation devices can either be connected directly to a controller of the automation system or can first be connected to input and output modules, which are often referred to as I/O modules. These can in turn be connected directly to the controller. The automation devices can either be integrated directly in the I/O modules or can be connected to them via cable or wirelessly.

The control of an automation system is usually accomplished with the help of one or more programmable logic controllers, PLC. The PLCs can be arranged hierarchically or decentrally in an automation system. There are different performance levels for the PLC, so that they can take over different controls and regulating techniques depending on the computing and storage capacity. In the simplest case, a PLC has inputs, outputs, an operating system (firmware) and an interface via which a user program can be loaded. The user program determines how the outputs are to be switched in dependence on the inputs. The inputs and outputs can be connected to the automation systems and/or the I/O modules and the process executed by the automation system can be monitored or controlled by the logic stored in the user program. In this case, the monitoring of the process is accomplished by the sensors and the control of the process by the actuators. The controller can also be referred to as a central controller or central unit and assumes control of at least one automation device or I/O module connected to the controller.

However, the direct connection of the automation devices with the at least one controller or the I/O modules with the at least one controller in the form of a parallel wiring, i.e., a line is routed from each automation device or each I/O module to the higher-level control, is very expensive. Especially with the increasing degree of automation of an automation system, the wiring effort increases with parallel wiring. This is associated with great expense in the design, installation, commissioning and maintenance.

For this reason, automation systems generally use bus systems today, with which the automation devices or the I/O modules can be connected to the controller. The subscribers of a bus system are also referred to as bus subscribers. Because data is exchanged on the bus system, bus subscribers are also often referred to as data bus subscribers. To simplify the connection of the individual automation devices or the I/O modules with the bus system even further, nowadays often individual groups of automation devices or I/O modules are first interconnected to a local bus system with the help of a specialized local bus and then, at least one subscriber of this local bus is connected to the bus system, which is connected to the controller. In this case, the local bus system may differ from the bus system which is used to realize the connection with the controller.

The subscriber of a group of local bus subscribers connected to the bus system of the controller is often referred to as a local bus master. Alternatively, the term header of the local bus system is used. This local bus master can contain additional logic, circuits or functionalities different from other local bus subscribers, which are necessary for connection to the bus system of the controller. Also, the local bus master itself may include a PLC. This subscriber can also have logic and circuits for conversion between the two bus systems. The local bus master can therefore also be designed as a gateway or bus converter and ensures conversion of the data that is present in the format of the one bus system to the format of the local bus system and vice versa. Usually but not mandatory, the local bus master is specialized for connecting the local bus to the higher-level bus.

The local buses used are mostly tailored to the specific use requirements of the automation devices or I/O modules or take into account their special hardware configuration. The groups of automation devices or I/O modules of the local bus system usually form a subgroup of the automation system for the execution of a special task in the process performed by the automation system. The data exchanged on the buses for the process is also often referred to as local bus data or process data, because this data contains information for regulating or controlling the process executed by the automation system. This data may include, but is not limited to, measurement data, control data, status data, and/or other types of information. Depending on the bus protocol used, this data may be preceded (header) or appended (tail) by other data. This other data may include information regarding the data or include information regarding internal communication on the local bus. Here, a variety of different information is known, which can be prefaced or added to the data according to the bus protocol used.

An example of a local bus is a ring bus, which is a specialized form of local bus, as known from U.S. Pat. No. 5,472,347 A. In a ring bus, the data bus subscribers, for example, the automation devices or I/O modules, are each connected with their directly adjacent data bus subscriber and data is forwarded in order from one to the other data bus subscriber. Thus, the data is not sent to the data bus subscribers simultaneously, but in turn, wherein a data bus subscriber receives data from its upstream data bus subscriber and forwards data to its downstream data bus subscriber. Between receiving the data and forwarding, the data bus subscriber can process the received data. When the data has reached the last data bus subscriber in the series, the data from the last data bus subscriber is returned back to the first data bus subscriber in succession. The return can be done either by all data bus subscribers or past them with the help of a bypass line. The ring bus thus has a downlink flow and an uplink flow of data. The data in a ring bus is usually transmitted in the form of data packets that pass through all data bus subscribers.

In such a ring bus arrangement or in another local bus, it is complicated to program the data bus subscribers. To program the data bus subscribers, for example, the transmission on the bus must be interrupted, or the data bus subscriber must be programmed via an external interface, wherein the data bus subscriber cannot participate in the communication on the local bus during this time.

SUMMARY OF THE INVENTION

It is therefore an object of the present invention to provide an improved method, an improved data bus subscriber and a local bus master, with which the programming of the data bus subscribers is also possible during operation of the local bus, such that the data bus subscriber can process data during operation of the local bus immediately after programming.

The method according to the invention for operating a data bus subscriber of a local bus, in particular of a ring bus, comprises the steps of receiving a first data packet via the local bus, wherein the first data packet has an address of the data bus subscriber to which it is directed and at least one instruction list with a set of instructions for processing process data. Directed in this case means that the instruction list contained in the data packet is meant for a particular data bus subscriber in the local bus. The instructions of the instruction list can be very different processing steps that are to be carried out with the process data. The at least one instruction list contains, for example, instructions that specify a set of rules for processing the process data. The set of rules defines, for example, which process data is to be selected by a data bus subscriber from a data stream cycling through the local bus, which data is to be read, or at which locations data is to be written by the data bus subscriber, and/or which process data is to be manipulated by the data bus subscriber in a different manner. The instruction lists accordingly define a behavior of the data bus subscriber with respect to the process data to be processed. The data bus subscriber to whom the instruction list is directed can store the instruction list in a memory and use the instruction list for processing process data at a later date. For this purpose, the instruction list can be stored in such a way that it can be found specifically. The storage can include all kinds of ways to hold the instruction list. It is only important that the data bus subscriber have access to the received, at least one, instruction list, i.e., have access to the memory. Accordingly, the at least one instruction list may be stored in the data bus subscriber itself, for example in a memory of the data bus subscriber, or in a memory connected to the data bus subscriber. The connection between data bus subscriber and memory can be wired or wireless. It is also conceivable that the memory is an additional module, which can be connected with the data bus subscriber. The memory can be configured as desired.

The first data packet may also be referred to as a communication data packet and preferably does not contain any process data. Advantageously, a communication data packet contains data, in particular for programming and/or for controlling and/or for monitoring and/or for identifying at least one data bus subscriber. Advantageously, the communication data packet has an address which is assigned to at least one data bus subscriber. Preferably, the data bus subscriber is set up to evaluate the address and to read the communication data packet, so that the data bus subscriber can be programmed with the information contained in the communication data packet, for example the instruction list, or stores this information and is programmed with it.

Next, the inventive method comprises receiving a second data packet via the local bus, wherein the second data packet has process data. This received process data can then be processed by executing instructions of the at least one instruction list received in the first data packet.

The second data packet may also be referred to as a process data packet and contains process data that is sent and/or received by the data bus subscribers of the local bus. Advantageously, the process data packet has no address for transmitting the process data to or from a data bus subscriber in the local bus. In the process data packet, the process data is arranged, for example, in such a way that data bus subscribers can recognize the process data associated with the respective data bus subscriber based on the respective position of the process data in the process data packet, for example one or more bits within an associated contiguous data block (1 byte). Advantageously, the process data packet has an identifier (IDE) which is assigned to the type of the data packet, that is to say to the process data packet, and can be identified by the data bus subscriber. The process data can also be called local bus data.

By using a first data packet, which is sent in a local bus-compliant communication to a data bus subscriber, the latter can be programmed without the need for external programming. Accordingly, programming of the data bus subscriber takes place during operation of the local bus. As soon as the data bus subscriber has stored the instruction list contained in the first data packet, the programming of the data bus subscriber is completed, and it can process the process data contained in a further local bus-compliant communication.

In an exemplary embodiment of the method according to the invention, this further comprises comparing the address received in the first data packet with an address of the data bus subscriber. Only if the addresses match does the data bus subscriber store the instruction list following in the first data packet, so that only the data bus subscriber to which the instruction list is directed is programmed. For example, the address may also be a group address, that is, multiple data bus subscribers will detect a match with the address so that multiple data bus subscribers can be programmed. This is advantageous, for example, if a plurality of data bus subscribers undertake the same task in the automation system and are accordingly also equipped with the same sensors and/or actuators but occupy different positions in the automation process, for example.

The first and second data packets can be received in a cycle frame that complies with the local bus. This means that the programming as well as the process data to be processed with the programming can be sent in the same cycle frame. However, it is also possible that the first and second data packets are received in different cycle frames. A cycle frame can be defined, for example, as a recurrent (cyclic) preferably equidistant time interval in which data is transferable on the local bus. The cycle frame has, for example, at least one start identifier (SOC) and one time range for the transmission of data. Several start identifiers (SOC) of successive cycle frames are advantageously at a time equidistant from each other. The named time range is intended for the transmission of the data packets. The start identifier (SOC) and the data packets are transmitted via the local bus and pass through all the data bus subscribers. The start identifier (SOC) is separate, i.e., transferable as an independent symbol or advantageously contained in a start data packet (SOC packet).

Within the time range of the cycle frame, none, one or more data packets are transmitted. Advantageously, idle data is inserted in a cycle frame, in particular adjacent to at least one data packet. Advantageously, the transmission of the data packets and/or the idle data causes an uninterrupted signal on the local bus. The signal allows for the data bus subscribers to synchronize to this time. Advantageously, the cycle frame additionally has a trailer. The trailer has a variable length and preferably follows the time range for data transmission up to the next start identifier (SOC) of the next cycle frame. Advantageously, the trailer contains idle data.

Preferably, the cycle frame can be generated by a local bus master. This local bus master can already specify the programming according to the process data to be processed. This has the advantage that there is no interruption in the communication. Also, the additional overhead for the local bus master is very low, because this does not need extra communication for programming or need to elaborately adapt the local bus-compliant communication, but instead the local bus master can integrate programming into the normal process data communication.

The second data packet further can have an instruction list index (ILI). This instruction list index is used to select an instruction list for processing the received process data. The instruction list index informs the data bus subscriber as to which stored instruction list to use. Thus, an instruction list index is assigned to an instruction list or vice versa, so that the instruction list to be used can be identified with the aid of the instruction list index. For this purpose, the instruction list index preferably has a value which is assigned to an instruction list, for example, the value indicates a specific instruction list or its memory location. For this purpose, the value itself may be the memory address where the instruction list is stored in the data bus subscriber or where at least a first instruction of the instruction list is stored. Alternatively, or additionally, the value can also indicate a memory area in which the corresponding instruction list is stored. In the aforementioned cases, one can also speak of direct assignment. The value of the instruction list index can, for example, also be used as input of a conversion table (Lookup Table, LUT). The value of the instruction list index is the input value of the conversion table. The output value of the conversion table may be the memory address of the first instruction in the associated instruction list or may otherwise identify the instruction list. The instruction list index may preferably have a value from a fixed value range. For example, the instruction list index may be from the bit value range between 0000 to 1111. However, it is clear to the person skilled in the art that other ranges of values can also be used. The conversion table can be stored as software as well hardware in the form of, for example, logic and can indicate a one-to-one conversion from an input value to an output value, wherein the output value gives an indication of the instruction list to be used. It depends on the conversion table as to how a connection between the instruction list index and the instruction list is established. When using a conversion table, it is also possible to speak of indirect assignment. With the direct as well as indirect assignment, however, the instruction list to be used by the data bus subscriber is uniquely identifiable, i.e., findable via the instruction list index. The instruction list found via the instruction list index is then executed by the data bus subscriber to process the process data in the second data packet. Thus, the set of instructions of the selected instruction list is run. If the instruction list index contains a reference to an instruction list that does not exist on the data bus subscriber, the data bus subscriber can report an error. Also, the data bus subscriber can ignore the instruction list index and not run an instruction list for the process data.

The first and second data packet can have a number of symbols, wherein each symbol has a number of bits, for example 8 bits, that is, 1 byte. However, those skilled in the art will appreciate that the division of the data packets may also be done in other units comprising more or less than 8 bits. The data packets pass through the local bus in the form of these symbols, i.e., unit-by-unit, piecewise, or partwise. Such a part of the data packets is also referred to below as a piece or unit. This means that the data bus subscribers always have only a part of the data packets at any given time. In this case, a data bus subscriber receives the first and second data packets symbol by symbol. After processing a symbol, the data bus subscriber sends the part just processed to the downstream data bus subscriber and in the same step receives a new part of the data packets from the upstream data bus subscriber. Processing a part of a data packet may also involve the data bus subscriber skipping said part of the data packet. For example, all data bus subscribers to which the first data packet is not directed may skip the at least one instruction list contained in this data packet and only the data bus subscriber to which the first data packet is directed may store the instruction list. For a deterministic processing time to be guaranteed, each part of the data packets always remains the same length on a data bus subscriber, regardless of whether processing takes place or not. This is necessary to give the other data bus subscribers enough time to perform processing with the parts of the data packets present at these data bus subscribers before a new part of the data packets is received. The processing of the parts of the first data packet can include either the skipping, i.e., the non-processing, of the at least one instruction list or of its storage when the first data packet is directed to the data bus subscriber, which receives the respective parts. Processing of the parts of the second data packet may be to perform a bit operation on the received process data. In this case, it can also be said that the processing is bit-granular. The bit operations that can be performed are based, for example, on a reduced instruction set that the data bus subscriber can perform, such as "SKIP", "MOVE", "NEGATION", "INCREMENT", "AND" and "OR", or a combination thereof. Which of the bit operations are to be executed is stored in the data bus subscriber with the help of instruction lists. An instruction list can be sent to the respective data bus subscriber in a first data packet and represents the programming of the data bus subscriber.

For each part of the second data packet or for each bit of the second data packet, these instruction lists contain at least one instruction, i.e., an operation to be performed with the corresponding bit. There may be a fixed number or a predetermined number of instructions in the instruction list for each symbol. This means that each data bus subscriber performs a certain number of instructions per symbol in the time it has available for processing. If, for example, the data bus subscriber is not to carry out processing with the bit, then the corresponding instruction list for the corresponding bit may be empty or have a "SKIP" instruction. The instruction list may also have the number of repetitions for a particular instruction. For example, the instruction list may have a "SKIP" instruction, with the note to repeat this twice. In this case, the next two bits are not processed, but instead skipped. Parameters can also be specified for the instructions "MOVE", "NEGATION", "INCREMENT", "AND" and "OR".

The address in the first data packet can be a unique address of the data bus subscriber to which the first data packet is directed. In this case, directed means that the instruction list contained in the first data packet is stored only by the data bus subscriber whose address matches the unique address in the first data packet. This means that programming is only performed on the data bus subscriber whose address matches the address in the first data packet. Accordingly, the first data packet may also be referred to as a directed or specific data packet because it is intended for only one data bus subscriber or a particular group of data bus subscribers, whereas the second data packet may not include an address and accordingly may be referred to as an undirected or undetermined data packet. In this case, the second data packet is undetermined because it carries the process data for all data bus subscribers of the local bus. It can also be said that the first data packet represents an asynchronous communication, whereas the second data packet represents a synchronous communication. The communication of the first data packet is asynchronous, because the first data packet does not have to be retransmitted in each cycle frame, but instead is only used once for programming a data bus subscriber. The communication of the second data packet is synchronous because the second data packet is cyclically repeated. In this case, the process data does not always have to assume the same value, but it is clear to the person skilled in the art that in the case of automation, the same process steps are repeated over and over again, which necessitates the presence of cyclically recurring process data.

The object mentioned above is also achieved by a data bus subscriber of a local bus, in particular of a ring bus, wherein the data bus subscriber has a receiver for receiving a first data packet via the local bus, wherein the first data packet contains an address of the data bus subscriber to which it is directed and at least one instruction list with a set of instructions for processing process data. The data bus subscriber according to the invention furthermore has a receiver for receiving a second data packet via the local bus, wherein the second data packet contains process data. The receiver for receiving may be a receiver circuit or a transceiver circuit. The circuits are implemented, for example, in an application specific integrated circuit (ASIC) or a field programmable (logic) gate array (FPGA).

The data bus subscriber according to the invention also can execute instructions of the at least one instruction list for processing the received process data via a microcontroller or an arithmetic circuit, which may be formed in particular of gate elements of an integrated circuit. The arithmetic circuit can be embodied as digital logic, which is designed in particular at least as a part of a semiconductor chip. The circuits can be implemented in an ASIC or a FPGA.

The data bus subscriber transmits the received second data packet to a further data bus subscriber via the local bus. The data bus subscriber can send the second data packet symbol by symbol to another data bus subscriber via the local bus. In this case, the further data bus subscriber can be a data bus subscriber that directly follows the transmitting data bus subscriber. The transmission of the data can be synchronized in all data bus subscribers, for example, to a timing predetermined by the local bus master or can be caused by receiving further data packets.

The above object is also achieved by a method for operating a local bus master of a local bus, in particular of a ring bus, wherein the method comprises generating at least one instruction list with a set of instructions for processing process data for a data bus subscriber, generating a first data packet, wherein the first data packet contains an address of the data bus subscriber to which the first data packet is directed, and the at least one instruction list, generating a second data packet, wherein the second data packet contains process data, and transmitting the first and second data packets to the data bus subscriber via the local bus.

The first and second data packet each can have a number of symbols, wherein each symbol has a number of bits, and wherein the data packets are sent symbol by symbol to the data bus subscribers. Accordingly, the local bus master cyclically sends a first and second data packet and these successively pass through all data bus subscribers in the downlink direction, i.e., away from the local bus master. The last data bus subscriber in the local bus then sends the parts back one after the other back to the local bus master in the uplink direction, i.e., towards the local bus master. The returned parts either pass through all data bus subscribers again or are routed past these to the local bus master.

The above object is also achieved by a local bus master of a local bus, in particular of a ring bus, with a data bus subscriber. In this case, the local bus master has a generator for generating at least one instruction list with a set of instructions for processing process data for the data bus subscriber and a generator for generating a first data packet, wherein the first data packet comprises an address of the data bus subscriber to which the first data packet is directed, and the at least one instruction list. Furthermore, the local bus master according to the invention has a generator for generating a second data packet, wherein the second data packet contains process data. The generator for generating can be, for example, a processor, a microcontroller, or an arithmetic circuit, which may be formed in particular of gate elements of an integrated circuit. The arithmetic circuit can be embodied as digital logic, which is designed in particular at least as a part of a semiconductor chip. The circuits can be implemented as an ASIC or a FPGA.

Furthermore, the local bus master according to the invention has a transmitter for transmitting the first and second data packet to the data bus subscriber via the local bus. In this case, the two data packets can be sent in a cycle frame, which can be generated for sending. The transmitter for transmission can transmit the two data packets even in different cycle frames and can generate the corresponding cycle frames. The transmitter for transmission may be, for example, a transmitter circuit or a transceiver circuit. The circuits are implemented, for example, in an ASIC or FPGA.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
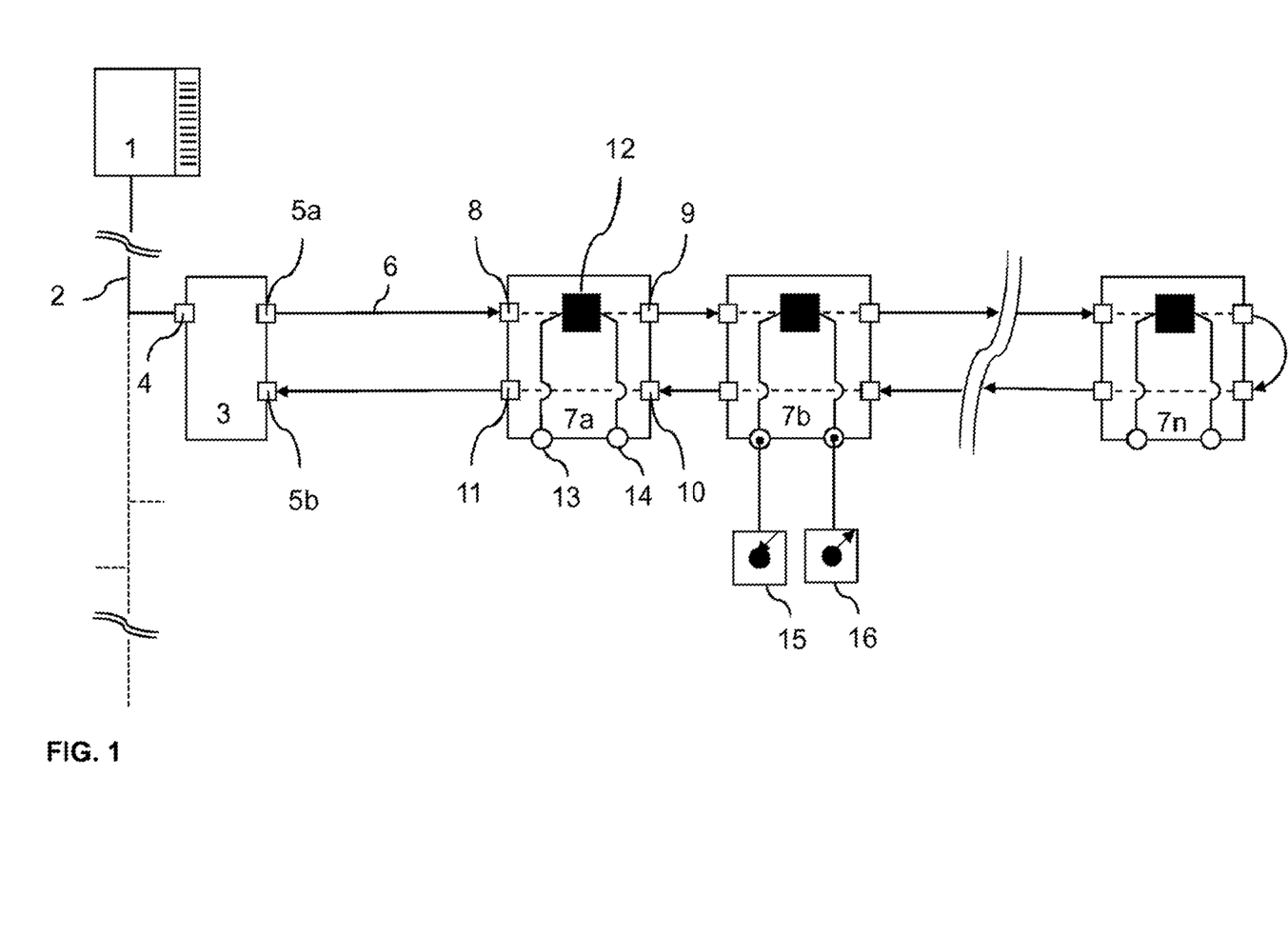
FIG. 1 is a schematic block diagram of an exemplary automation system with a programmable logic controller and an exemplary ring bus.

FIG. 1 shows a schematic block diagram of an automation system. It will be understood by those skilled in the art that the automation system shown is only an example and all the elements, modules, components, subscribers and units belonging to the automation system can be configured differently but can nevertheless fulfill the basic functions described here.

The automation system shown in FIG. 1 has a higher-level control 1, which can be realized for example with a programmable logic controller, PLC. Such a PLC 1 basically serves to control and regulate the process performed by the automation system. However, PLCs 1 in automation systems today also take on more advanced functions, such as visualization, alerts and recording of all data relating to the process, and as such, the PLC 1 functions as a human-machine interface. There are SPS 1 in different performance levels, which have different resources (computing capacity, storage capacity, number and type of inputs and outputs, and interfaces) that enable the PLC 1 to control and regulate the automation system process. A PLC 1 usually has a modular design and is formed of individual components, each fulfilling a different task. Usually, a PLC 1 includes a central arithmetic unit (with one or more main processors and memory modules) and several modules with inputs and outputs. Such modular PLCs 1 can be easily expanded by adding modules. It depends on the complexity of the process and the complexity of the structure of the automation system as to which modules must be integrated in the PLC 1. In today's automation systems, the PLC 1 is also usually no longer an independent system, but the PLC 1 is connected via appropriate interfaces to the Internet or intranet. This means that the PLC 1 is part of a network via which or from which the PLC 1 can obtain information, instructions, programming, etc. For example, via a connection to a computer located on the intranet or the Internet, the PLC 1 may receive information about the materials supplied to the process, such that, for example, by knowing the number of them or their nature, the process can be optimally controlled. It is also conceivable that the PLC 1 is controlled by user access from the intranet or Internet. For example, a user using a computer, also called a host computer, can access the PLC 1 and check, change, or correct its user programming. Accordingly, access to the PLC 1 from one or more remote stations or control centers is possible. If necessary, the host computers can have visualization devices for displaying process sequences.

To control the process of the automation system, the PLC 1 is connected with automation devices. In order to keep the wiring costs low, bus systems are used for these connections. In the exemplary embodiment shown in FIG. 1, the PLC 1 is connected to a local bus master 3 of a subordinate local bus system by means of a higher-level bus 2, which in the exemplary embodiment shown here can be a field bus. However, not only a local bus master 3 of a local bus can be connected to the higher-level bus 2 as in the embodiment shown here, but also any other subscribers which are designed for communication with the PLC 1.

The higher-level bus 2 is connected to the local bus master 3 in the exemplary embodiment shown here. For this purpose, the local bus master 3 has a first interface 4, which is designed such that it can be connected to the higher-level bus 2. For this purpose, the interface 4 can for example have a receptacle in the form of a socket and the higher-level bus 2 can have a plug, which can be accommodated by the socket. In this case, the plug and the socket, for example, can be a modular plug and a modular socket, i.e., each wire of the higher-level bus 2 is connected to a connection electrically or optically in the modular socket. However, the person skilled in the art also knows other ways in which an interface 4 is to be designed so that the local bus master 3 can be electrically or optically connected to the higher-level bus 2. The expert knows of screw, turn, click or plug connections, with the help of which an electrical or optical connection can be made. In most cases, a male plug is accommodated by a female counterpart. This receiving usually does not only produce the electrical or optical connection, but also ensures that the two parts are mechanically coupled and can only be released from each other again with the application of a certain force. But it is also conceivable that the higher-level bus 2 is hardwired to the interface 4.

The local bus master 3 in the embodiment shown here has a further second interface to connect the local bus master 3 with the local bus. Data bus subscribers 7a, 7b, . . . , 7n are connected to the local bus or form this. The local bus is advantageously configured such that a data packet signal sent from the local bus master 3 is transmitted through all data bus subscribers 7a, 7b, . . . , 7n connected to the local bus, and back to the local bus master 3. In this case, a data bus subscriber 7a, 7b, . . . , 7n receives only a part of the data packet from its upstream data bus subscriber 7a, 7b, . . . , 7n. After a period of time in which the data contained in this part can be processed by the data bus subscriber 7a, 7b, . . . , 7n, the part is forwarded to the downstream data bus subscriber 7a, 7b, . . . , 7n, and at the same time, a new part of the data packet is received by the upstream data bus subscriber 7a, 7b, . . . , 7n. In this way, all parts of the data packet sequentially pass all data bus subscribers 7a, 7b, . . . , 7n. The local bus is advantageously formed in an annular structure. Such local buses can also be referred to as ring bus 6. Alternatively, the local bus can also be formed in a strand-shaped or star-shaped manner or from a combination or mixed form of the aforementioned. The transmission and reception of the data packets is accomplished via the second interface of the local bus master 3. In the embodiment shown here, the second interface is divided into a first part 5a and a second part 5b. The first part 5a of the second interface establishes the downlink in the ring bus 6 and the second part 5b of the second interface establishes the uplink in the ring bus 6.

The ring bus 6, whose data transmission direction is shown with arrows in the exemplary embodiment shown in FIG. 1, has a plurality of data bus subscribers 7a, 7b, . . . , 7n in the exemplary embodiment shown here. In the exemplary embodiment shown here, these data bus subscribers 7a, 7b, . . . , 7n each have an interface 8 so as to receive data from an upstream or preceding data bus subscriber 7a, 7b, . . . , 7n. In the case of data bus subscriber 7a, this receives data via the interface 8 from the upstream local bus master 3. Furthermore, the data bus subscribers 7a, 7b, . . . , 7n in the embodiment shown here in each case have an interface 9 in order to forward data to a downstream or subsequent data bus subscriber 7a, 7b, . . . , 7n. In the case of data bus subscriber 7a, this sends data to the downstream data bus subscriber 7b via the interface 9. The interfaces 8 and 9 serve to propagate data in the downlink direction of the ring bus 6, i.e., away from the local bus master 3. Further, the data bus subscribers 7a, 7b, . . . , 7n in this embodiment also comprise interfaces 10 and 11 for propagating data in the uplink direction of the ring bus 6, i.e., towards the local bus master 3. In the case of the data bus subscriber 7a, interface 10 is designed to receive data from the downstream or subsequent data bus subscriber 7b and interface 11 is adapted to forward data to the upstream or preceding data bus subscriber, here the local bus master 3. It can therefore also be said that the interfaces 9 and 11 are transmitter interfaces, whereas the interfaces 8 and 10 are receiver interfaces.

In the embodiment shown here, the connections of the interfaces and of the PLC 1 or data bus subscribers 7a, 7b, . . . , 7n are realized by means of cables or printed circuit boards for direct or indirect contacting by means of electrical contacts. Another alternative is that the individual connections are made wirelessly, and the interfaces provide the necessary conversions to the radio standards used.

Even if the local bus master 3 and the individual data bus subscribers 7a, 7b, . . . , 7n are spaced from each other in the embodiment shown here, i.e., the local bus master 3 is arranged decentralized from the data bus subscribers 7a, 7b, . . . , 7n, the person skilled in the art is aware that the data bus subscribers 7a, 7b, . . . , 7n and the local bus master 3—which also represents a data bus subscriber of the ring bus 6—can also be connected directly to one another. In this case, for example, contacts of a data bus subscriber can engage in appropriate receptacles or receptacle contacts of a directly adjacent data bus subscriber so as to establish an electrical connection between the data bus subscribers so that data can be sent in the downlink and uplink directions. For example, the data bus subscribers 7a, 7b, . . . , 7n may have receptacles at the side facing away from the master and have contacts on the side facing the master. If the data bus subscribers 7a, 7b, . . . , 7n are then juxtaposed accordingly, the contacts of the one data bus subscriber 7a, 7b, . . . , 7n respectively engage into the receptacles of the other data bus subscriber 7a, 7b, . . . , 7n and an electrical connection can be made. The local bus master 3 then has corresponding contacts on the side, which engage in the receptacles of the first data bus subscriber 7a so as to generate an electrical connection between the interfaces 5a and 8 or the interfaces 5b and 11. The skilled person also knows other ways, such as pressure contacts, blade and fork contacts, as to how two data bus subscribers 7a, 7b, . . . , 7n arranged directly adjacent to each other can make an electrical or optical connection.

In the case that the data bus subscribers 7a, 7b, . . . , 7n and the local bus master 3 are to be connected directly to one another, they can also have mechanical receptacles or mechanical fastener with which the individual data bus subscribers 7a, 7b, . . . , 7n and the local bus master 3 can be interconnected. Here, for example, a data bus subscriber 7a, 7b, . . . , 7n can have a projection on one side and an undercut on the other side. If the data bus subscribers 7a, 7b, . . . , 7n are then lined up, a projection engages in an undercut of the other data bus subscriber 7a, 7b, . . . , 7n so that a mechanical coupling is produced. To simply string together the data bus subscribers 7a, 7b, . . . , 7n, these can also be arranged on a common receptacle, for example a DIN rail. For fixing on the DIN rail, the data bus subscribers 7a, 7b, . . . , 7n have corresponding fasteners. Alternatively, or additionally, the data bus subscribers 7a, 7b, . . . , 7n can also, for example, have releasably connected fasteners with which the data bus subscribers 7a, 7b, . . . , 7n can be mounted either on the DIN rail or on another receptacle. For this purpose, the releasably connectable fasteners can be exchangeable and corresponding fasteners for the desired receptacle can be connected with the data bus subscribers 7a, 7b, . . . , 7n, so that these can be attached at the desired receptacle.

Furthermore, the data bus subscribers 7a, 7b, . . . , 7n in the exemplary embodiment shown in FIG. 1 also have a processing unit 12. This processing unit 12 can be an arithmetic logic unit or another type of arithmetic unit with which data can be processed. The processing unit 12 is preferably an integral part of the data bus subscriber 7a, 7b, . . . , 7n in order to ensure a particularly fast and time-synchronized processing of the data.

The processing unit 12 may also be referred to as the overall circuit of the data bus subscriber. That is, the processing device 12 receives data via the inputs 8 and 10 and outputs data at the outputs 9 and 11. Furthermore, the processing device 12 can receive or output data from the inputs and outputs 13 and 14. Furthermore, the processing unit 12 has access to a memory of the data bus subscriber 7a, 7b, . . . , 7n in which, for example, data, process data, or instruction lists are stored.

The processing unit 12 may be configured to process received data and to output data. Data to be processed can be received either from an upstream data bus subscriber or from inputs 13 of the data bus subscriber 7a, 7b, . . . , 7n. The inputs 13 of the data bus subscriber 7a, 7b, . . . , 7n can be connected to sensors 15, which send, for example, measurement data, status data, etc. Processed data can be output either to a downstream data bus subscriber or to outputs 14 of the data bus subscriber 7a, 7b, 7n. In this case, the outputs 14 of the data bus subscriber 7a, 7b, . . . , 7n can be connected to actuators 16, which perform a certain action, for example, using the data directed to them. If processing of the data is also to take place in the uplink direction, data can also be received by a downstream data bus subscriber 7a, 7b, . . . , 7n and processed data can be sent to an upstream data bus subscriber 7a, 7b, . . . , 7n.

For the sake of simplicity, in the embodiment shown here, the data bus subscribers 7a, 7b, . . . , 7n are shown only with an input 13 and an output 14 and only data bus subscriber 7b is connected to sensor 15 and actuator 16. However, the person skilled in the art is aware that the data bus subscribers 7a, 7b, . . . , 7n may have a plurality of inputs and outputs 13 and 14 and can be connected to a plurality of different sensors 15 and actuators 16. In this case, the feature 15 characterizing the sensors is that the sensors 15 receive data or signals and send the data to the data bus subscribers 7a, 7b, . . . , 7n, whereas actuators 16 receive data or signals from the data bus subscribers 7a, 7b, . . . , 7n and perform an action based on these data or signals.

Alternatively, the interfaces 8, 9, 10 and 11 can be integrated in one module unit and the data bus subscribers 7a, 7b, . . . , 7n can be plugged onto this module unit. The modular units can also be referred to as basic elements of the ring bus 6. The ring bus infrastructure is constructed by the module units and the data bus subscribers 7a, 7b, . . . , 7n are interchangeable, so that the ring bus 6 can be constructed with any data bus subscriber 7a, 7b, . . . , 7n. With the help of module units, it is also ensured that even if a data bus subscriber 7a, 7b, ..., 7n is removed, the communication between the remaining data bus subscribers 7a, 7b, ..., 7n is not interrupted because the communication occurs via the remaining module units.

The data bus subscribers 7a, 7b, ..., 7n shown in this embodiment are often called I/O modules due to their inputs and outputs 13, 14 that can be connected to sensors 15 or actuators 16. Even if the data bus subscribers 7a, 7b, ..., 7n are spatially separated from the sensors 15 or actuators 16 in the exemplary embodiment shown here, the sensors 15 or actuators 16 can be integrated in the I/O module.

Figure 2:
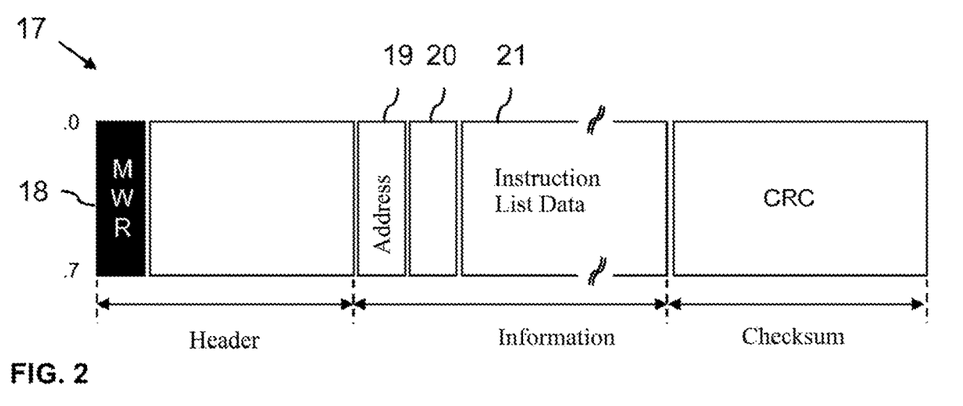
FIG. 2 is a schematic representation of a first data packet for programming a data bus subscriber.
Figure 3:
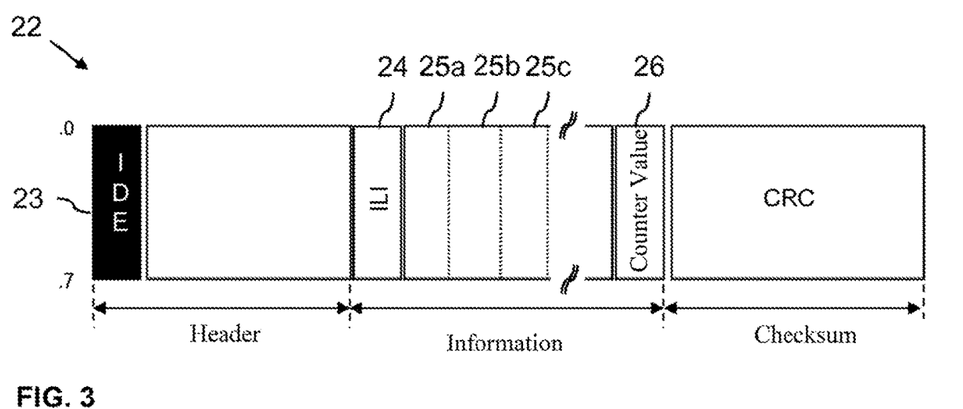
FIG. 3 is a schematic representation of a second data packet for transmitting process data to data bus subscribers.

The ring bus 6 shown in the embodiment shown here is often based on a cyclically repeating sequence of data packets or telegrams, often referred to as cycle frame communication. In this case, for example, data packets are generated by the local bus master 3, which have a header, a process data part or information data part and a checksum part. The process data part or information data part of the data packet can have payload data, control data and process data—as shown in FIGS. 2 and 3. The one data packet or the data packets are sent from the local bus master 3 in the downlink direction to the first data bus subscriber 7a of the ring bus 6. This receives a first part of the data packet via the interface 8. Such a part of the data packet is also referred to below as a piece or unit. The data bus subscriber 7a then carries out a processing of the part, and then forwards the part to the next data bus subscriber 7b via interface 9; preferably simultaneously, the first data bus subscriber 7a receives a second portion of the data packet, etc. The size of the portions of the data packets, that is, the division, depends on the intake capacity of the data bus subscribers 7a, 7b, 7n, for example, a fixed number of bits, for example 8 bits of the data packet, may be present at the data bus subscriber 7a, 7b, ..., 7n for processing at the same time.

Accordingly, the data packets cycle through the data bus subscribers 7a, 7b, ..., 7n unit-by-unit, piecewise, or partwise, for example, in parts or symbols of 8 bits. The data packets, which have been processed by the last data bus subscriber in the embodiment shown here data bus subscriber 7n then go through the ring bus 6 in the uplink direction, so that the parts are again sent upwards towards the local bus master 3 through all data bus subscribers 7a, 7b, ..., 7n, starting from the last data bus subscriber 7n. For this purpose, the last data bus subscriber 7n either has a switchable bridge which connects the interface 9 to the interface 10, or a switchable bridge is connected to the last data bus subscriber 7n, which takes over the role of routing parts of the cycle frame of from the interface 9 to the interface 10. Alternatively, the interface 10 of the data bus subscriber 7n may also be connected directly to the interface 5b of the local bus master 3 by means of a bypass line.

In the uplink direction, the data packets may be looped back through the individual data bus subscribers 7a, 7b, ..., 7n to the local bus master 3 as in the embodiment shown here, without further processing taking place. But it is also conceivable that further processing of the data packets takes place in the uplink direction so that the data packets are processed twice, once in the downlink direction to the last data bus subscriber 7n and once in the uplink direction to the local bus master 3. For example, processing by signal refresh and/or phase shift can be done in the uplink direction.

When processing the data packets in the downlink direction, i.e., away from the local bus master 3, or in the uplink direction, i.e., towards the local bus master 3, the processing is accomplished by means of instruction lists, wherein the instruction lists contain sets of instructions which can be executed by the processing unit 12 of the data bus subscribers 7a, 7b, ..., 7n. The instruction lists themselves can be sent to the individual data bus subscribers 7a, 7b, ..., 7n in an initialization phase by the local bus master 3 or, advantageously, sent to the data bus subscribers 7a, 7b, 7n during the ongoing communication so that programming of the data bus subscribers 7a, 7b, ..., 7n takes place without interrupting communication.

FIG. 2 shows a schematic representation of a first data packet 17 for programming a data bus subscriber 7a, 7b, ..., 7n without having to interrupt the ongoing communication. The first data packet 17 can be embedded in a sequence of data packets of the running cyclic communication and used to program a data bus subscriber 7a, 7b, ..., 7n. The programming of the one data bus subscriber 7a, 7b, 7n takes place here with the aid of instruction list information, which is sent in the first data packet 17 to the data bus subscriber 7a, 7b, ..., 7n to be programmed.

The first data packet 17 can be formed of a general header, an information part and a checksum part. The header includes a field 18 which contains a unique bit pattern MWR occurring only once, which may also be referred to as a codeword or identifier. The data bus subscribers 7a, 7b, ..., 7n have the knowledge that when the bit pattern MWR occurs, data is provided to the data bus subscribers 7a, 7b, ..., 7n. In this case, this data can just be the instruction lists for the data bus subscribers 7a, 7b, ..., 7n in order to program the data bus subscribers 7a, 7b, ..., 7n. The header of the first data packet 17 may also contain further information that is required for control or error detection.

The information part of the first data packet 17 contains a field 19 in which the address of the data bus subscriber 7a, 7b, ..., 7n to be addressed is stored. Only the data bus subscriber 7a, 7b, ..., 7n whose address matches the address stored in the field 19 reads the instruction list data 21 of the information part of the first data packet 17. The information part may also have an additional field 20, which can be used by the corresponding data bus subscriber 7a, 7b, ..., 7n whose address is stored in field 19 for error detection, error propagation, or this field 20 can contain instructions as to where the instruction list data 21 should be stored. The instruction list data 21 may include at least one instruction list or multiple instruction lists. After storing the instruction lists in the respective data bus subscribers 7a, 7b, ..., 7n, it can also be said that the programming of the data bus subscriber 7a, 7b, ..., 7n is completed. In this case, the instruction lists have sets of instructions which define the processing to be performed by the data bus subscribers 7a, 7b, ..., 7n. Furthermore, the first data packet 17 may also have a checksum part with which a cyclic redundancy test can be performed.

After a data bus subscriber 7a, 7b, ..., 7n has been programmed by means of the first data packet 17, i.e., as soon as the instruction list has been stored in the data bus subscriber 7a, 7b, ..., 7n, this data bus subscriber 7a, 7b, ..., 7n is ready for processing process data. This process data can already be received in the same cycle frame, which has programmed the data bus 7a, 7b, ..., 7n, namely in a second data packet which follows the first data packet in the cycle frame. Such a second data packet is shown in FIG. 3. However, the second data packet 22 can also be received in another cycle frame.

FIG. 3 shows a schematic representation of a second data packet 22 for the transmission of process data to the data bus subscribers 7a, 7b, ..., 7n of the ring bus 6. The second data packet 22 can be embedded in a cycle frame of the current communication, e.g., as part of the process data part.

The second data packet 22 be formed of a general header, an information part and a checksum part. The header includes a field 23 which contains a unique, one-time bit pattern IDE, which may also be referred to as a codeword or identifier. The data bus subscribers 7a, 7b, . . . , 7n have the knowledge that when the bit pattern IDE occurs, a process data packet is transmitted. The header of the second data packet 22 may further include other information that may be used for control and/or troubleshooting. The information part of the second data packet 22 may first comprise an instruction list index field, ILI, 24 indicating which instruction list the data bus subscribers 7a, 7b, . . . , 7n are to use.

For example, it can be provided in normal operation of the ring bus 6 that all data bus subscribers 7a, 7b, . . . , 7n use their first instruction list, whereas in the event of an error, the second instruction list is to be used. It is also conceivable that a first instruction list comprises instructions for process data in a first process data packet within one cycle frame, and a second instruction list may include a second set of instructions for process data in a second process data packet within a cycle frame. In this case, the first arrangement may be different from the second arrangement. For example, in a tool change on an actuator which is connected to a data bus subscriber 7a, 7b, . . . , 7n, another processing will be necessary, because in this case, also other process data specific for the new tool, i.e., for example, bits, are transmitted in a data packet in the cycle frame. That means that the first instruction list, for example, may be used prior to the tool change, whereas the second instruction list may be used after the tool change. The instruction list index 24 can directly refer to the memory location of the instruction list stored in the data bus subscriber 7a, 7b, . . . , 7n, or the instruction list index can have a value with which the data bus subscriber 7a, 7b, . . . , 7n can locate the corresponding instruction list, for example, via a conversion table so that according to the instruction list index 24 either a first or a second or another instruction list displayed by the instruction list index 24 can be used.

The information part of the second data packet 22 furthermore contains the actual process data 25a, 25b, 25c, . . . . The process data 25a, 25b, 25c, . . . is used at the data bus subscribers 7a, 7b, . . . , 7n to carry out a control, regulation or evaluation. The process data 25a, 25b, 25c, . . . can, for example, be output to actuators in order to cause an actuating movement of the actuator. The process data 25a, 25b, 25c, . . . can thus represent control signals or be converted by the data bus subscribers 7a, 7b, . . . , 7n into corresponding control signals. The process data 25a, 25b, 25c, . . . can for example also represent measurement values which are received by sensors, which are connected with the data bus subscribers 7a, 7b, . . . , 7n and can be used as limit or control values in order to drive the actuators accordingly. This means that the data bus subscribers 7a, 7b, . . . , 7n correspondingly convert the process data 25a, 25b, 25c, . . . into control signals and/or measurement signals or vice versa.

Furthermore, the second data packet 22 contains a counter value 26 which is incremented or decremented by each data bus subscriber 7a, 7b, . . . , 7n through which the second data packet 22 cycles, so that when the second data packet 22 arrives back at the local bus master 3, or this part of the second data packet 22 arrives again at the local bus master 3, it can be determined whether all data bus subscribers 7a, 7b, . . . , 7n have processed the cycle frame, which inherently also indicates as to whether a data bus subscriber 7a, 7b, . . . , 7n has an error and has failed to conduct processing. Furthermore, the second data packet 22 may also have a checksum part with which a cyclic redundancy check can be carried out.

Figure 4:
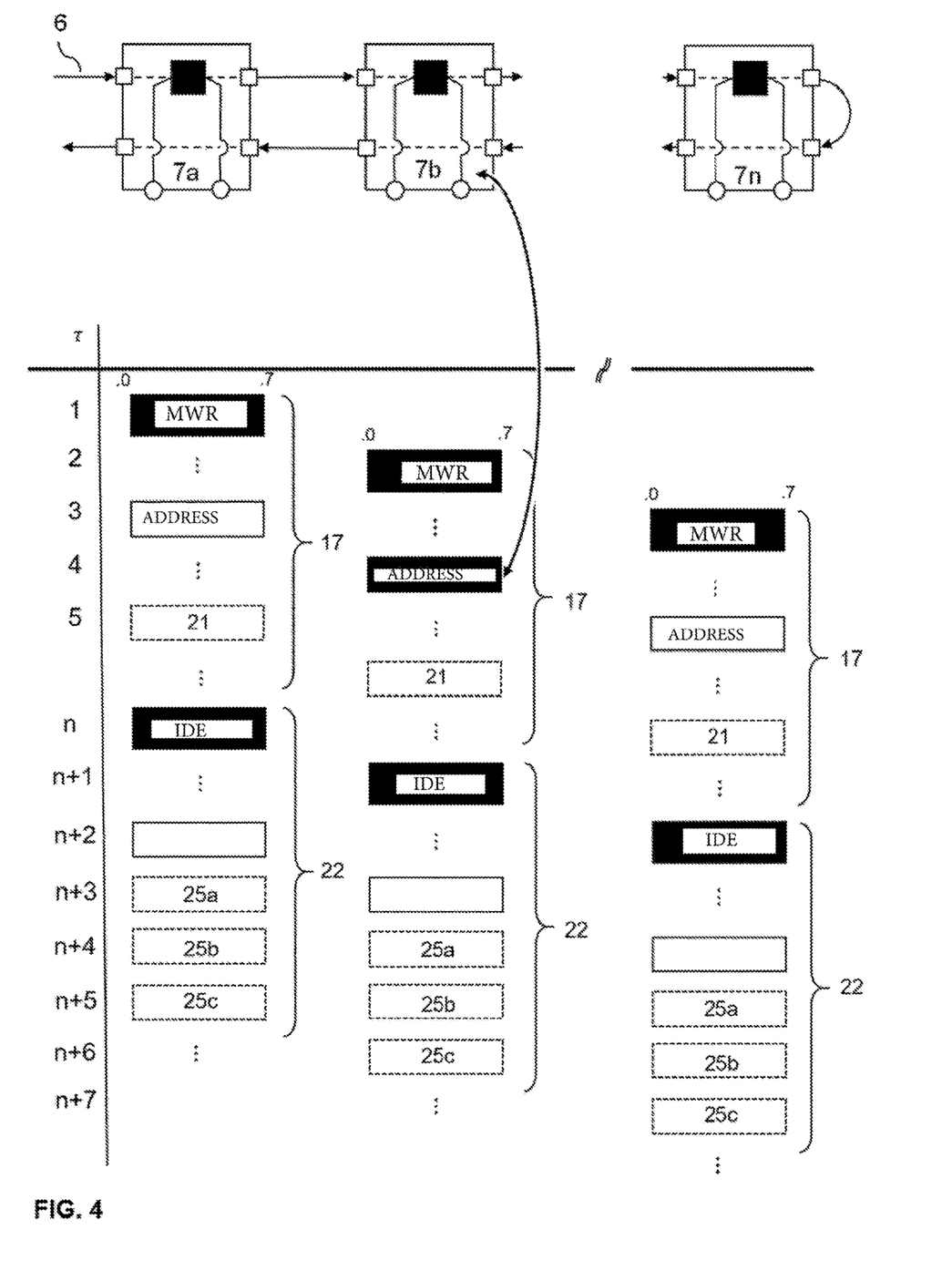
FIG. 4 is an exemplary timing diagram showing the cycling of the data packets shown in FIGS. 2 and 3 through the exemplary data bus subscribers of the ring bus shown in FIG. 1.

FIG. 4 shows an exemplary timing diagram of cycling the first and second data packets 17, 22 through corresponding data bus subscribers 7a, 7b, . . . , 7n of a ring bus 6. In the embodiment shown here, the second data bus subscriber 7b is programmed with the aid of the first data packet 17.

At the time τ=1, only the data bus subscriber 7a has received the bit pattern MWR of the first data packet 17 from the local bus master 3 in a first symbol. The data bus subscriber knows in this case that the following symbols of the first data packet 17 carry instruction list data 21. At this time, however, the data bus subscriber 7a does not know whether this instruction list data 21 is intended for it or for another data bus subscriber 7b, . . . , 7n in the ring bus 6. By receiving the symbol of the bit pattern MWR, the data bus subscriber 7a can be put in a receiving mode. That is, the data bus subscriber 7a awaits instruction list data 21 which can be stored in an accessible memory. In order to ensure a deterministic behavior of the ring bus 6, the symbol remains on the data bus subscriber 7a for a certain time before the latter forwards the symbol to the downstream data bus subscriber, here data bus subscriber 7b.

At the time τ=2, the data bus subscriber 7a has forwarded the first symbol to the second data bus subscriber 7b and has received another symbol from the local bus master 3. At this time τ=2, the second data bus subscriber 7b is also set to receiving mode, namely by obtaining the symbol of the bit pattern MWR. By forwarding the symbol bearing the MWR bit pattern, all data bus subscribers 7a, 7b, . . . , 7n are set to receiving mode.

At the time τ=3, the first data bus subscriber 7a receives a symbol of the first data packet 17 from the local bus master 3, in which a unique address of the data bus subscriber 7a, 7b, . . . , 7n is included, to which the instruction list data 21 is directed. In the embodiment shown here, this symbol contains the information that the instruction list data 21 is intended for the second data bus subscriber 7b. That is, if the first data bus subscriber 7a performs a comparison of its unique address with the unique address in the received symbol, the data bus subscriber 7a will find that its address and the address indicated in the symbol do not match. In this case, the data bus subscriber 7a can leave its receiving mode, because it is known that the following instruction list data 21 is not intended for this data bus subscriber 7a. In this case, it is irrelevant for the first data bus subscriber 7a as to for whom the instruction list data 21 is intended, but only that it is not intended for him, which is understood from the comparison.

In the embodiment shown here, at the time τ=4, the first data bus subscriber 7a has forwarded the symbol with the address to the second data bus subscriber 7b. The latter has performed a comparison of the unique address shown in the symbol with its unique address and has determined that there is a match. That is, the following instruction list data 21 is intended for the data bus subscriber 7b. Thus, as soon as the data bus subscriber 7b receives the instruction list data 21 in the following symbols, these are stored in an accessible memory. That is, the second data bus subscriber 7b is programmed.

The other data bus subscribers 7n through which the first data packet 17 cycles symbol by symbol are set to receiving mode by the symbol with the MWR bit pattern, but a comparison with the following symbol bearing the address shows that the instruction list data 21 is not intended for these data bus subscribers 7n, so they can again leave the receiving mode.

In the embodiment shown here, the second data packet 22 follows the first data packet 17. This data packet 22 also cycles through the ring bus 6, i.e., the data bus subscribers 7a, 7b, . . . , 7n, symbol by symbol.

At an assumed time τ=n, the first data bus subscriber 7a receives a symbol with the bit pattern IDE, which places the data bus subscriber 7a in a processing mode, because this bit pattern indicates that the following symbols carry process data 25a, 25b, 25c, . . . . The received symbol with the bit pattern IDE is then further routed through the data bus subscribers 7b, . . . , 7n to put them in the processing mode. The symbol with the IDE bit pattern is followed by a symbol with an instruction list index, ILI. By way of the instruction list index, the data bus subscriber 7a becomes aware of which stored instruction list to use in order to process the following process data 25a, 25b, 25c, . . . . This instruction list index is also passed through all data bus subscribers 7b, 7n. In the case of the second data bus subscriber 7b, this instruction list index can reference, for example, the instruction list just stored, which was received via the instruction list data 21 of the first data packet 17. It is thus possible to carry out programming of the data bus subscriber 7b in the same cycle frame and to apply the programming immediately thereafter for processing the process data 25a, 25b, 25c, . . . .

Although in the exemplary embodiment discussed in FIGS. 2 to 4, the first and second data packets 17, 22 were referenced, which are transmitted in the same cycle frame, it is clear to the person skilled in the art that the first and second data packets 17, 22 can also be transmitted in different cycle frames and that a cycle frame may contain only one of the shown data packets 17, 22.

Figure 5:
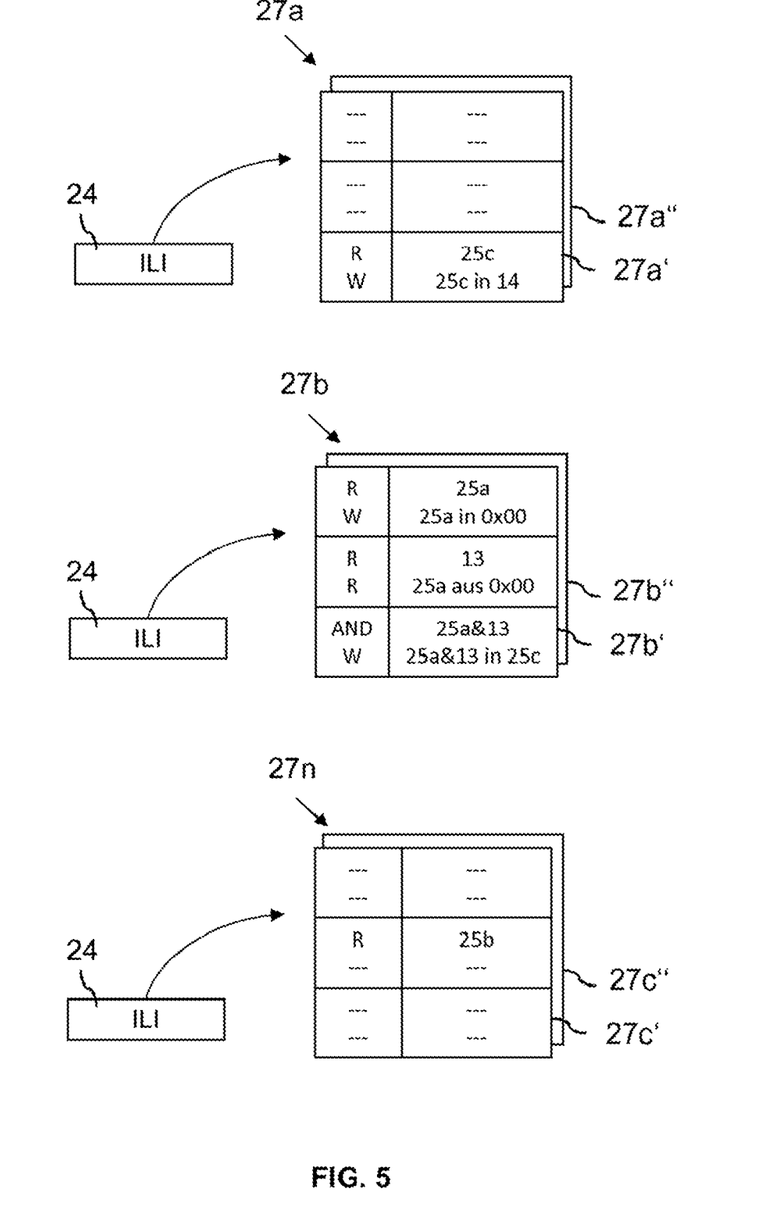
FIG. 5 is a schematic representation of instruction lists for processing the process data of the second data packet shown in FIG. 2.

The processing of the process data 25a, 25b, 25c, . . . with the aid of the instruction list indexes and the stored instruction lists is shown in FIG. 5.

FIG. 5 shows an exemplary processing of process data 25a, 25b, 25c, . . . with the aid of instruction lists 27a, 27b, 27n. In the embodiment shown here, the instruction lists 27a, 27b, 27n are shown as tables. In this case, the instruction list 27a is stored in the data bus subscriber 7a, the instruction list 27b in the data bus subscriber 7b and the instruction list 27n in the data bus subscriber 7n. In the embodiment shown here, each row of the table contains two instructions which can be executed with the symbol of the data packet currently pending at the data bus subscriber 7a, 7b, . . . , 7n. The skilled person is aware, however, that even if only two instructions for two cycles are shown here by way of example, a different number of instructions per symbol can be executed. Furthermore, it is clear to the person skilled in the art that the instruction lists 27a, 27b, 27n can also have their own instruction for each bit in the symbols of the process data 25a, 25b, 25c, . . . . For the sake of simplicity and for the sake of clarity, it has been omitted here to specify corresponding instructions for each bit.

As soon as the first data bus subscriber 7a receives the symbol with the instruction list index 24, it picks out the appropriate instruction list according to the instruction list index 24. In the embodiment shown here, the data bus subscriber 7a stores two instruction lists, namely instruction list 27a' and 27a". In the embodiment shown here, the instruction list index 24 refers to the instruction list 27a', for example, to the memory location of the first instruction of the corresponding instruction list 27a'. With the receipt of the next symbol carrying the process data 25a, the first instructions are executed in the instruction list 27a'. The first row of the instruction list 27a' of the data bus subscriber 7a is empty, which is marked with ". . . ", i.e., the data bus subscriber 7a does not execute any processing with the first received symbol because there is no instruction.

Instead of empty instructions, the instruction list 27a' at this point can also have "SKIP" instructions. For the next symbol which carries the process data 25b, too, the data bus subscriber 7a has no instructions in its instruction list 27a'. This means that this process data 25b is also not processed by the data bus subscriber 7a, but instead remains on the latter only for a certain time, for example, two cycles, to ensure a deterministic behavior of the ring bus 6 so that each data bus subscriber 7a, 7b, . . . , 7n has the same time available for each symbol that is currently present. Only for the third symbol reaching the data bus subscriber 7a, this has these instructions, namely "R" (read) the process data 25c and "W" (write) the process data 25c to the output 14, which may for example be connected to an actuator 16 in order to cause an actuating movement there.

In the exemplary embodiment shown here, the data bus subscriber 7b has also stored two instruction lists, namely instruction list 27b' and 27b". In this case, at least one instruction list 27b', 27b" may be one that was previously communicated to the data bus subscriber 7b via the instruction list data 21 of the first data packet 17. That is, it may be one with which the data bus subscriber 7b was programmed directly prior to receiving the process data 25a, 25b, 25c, . . . . In the embodiment shown here, the instruction list 27b' contains in the first line the instruction Read "R", namely the process data 25a from the first symbol reaching the data bus subscriber 7b after the symbol which carries the instruction list index 24. The second instruction is Write "W", namely the just-read process data 25a, i.e., into the memory at memory location oxoo. For the second symbol reaching the data bus subscriber 7b, the instruction list has processing steps that are not directly connected to the process data 25b carried by this symbol but only exploit the time that the data bus subscriber 7b has before it has to forward the symbol. In the embodiment shown here, the instruction list 27b' has the instructions that the input 13 of the data bus subscriber 7b is read, which is marked with "R", and that the previously stored process data 25a is read from the memory. The reading of the input may include, for example, reading a sensor value of a sensor 15 connected to the input 13. For the third symbol reaching the data bus subscriber 7b, the instruction list 27b' contains the instructions to create instructions for a bitwise combination "AND" of the value read by the input 13 and the process data 25a, and to write this combination into the symbol, i.e., to overwrite the process data 25c. The process data 25c can be overwritten, because it has already been read by the first data bus subscriber 7a and is no longer needed by the other data bus subscribers 7b, . . . , 7n. In this way, the calculated value can be forwarded to the local bus master 3 and the controller 1. It is known to the person skilled in the art that other calculations or bit operations can also be carried out here and the specified bit operations are intended only for the purpose of illustration but are not intended to be limiting.

The data bus subscriber 7n may also contain two instruction lists 27n' and 27n", wherein the instruction list index 24 indicates which of the instruction lists 27n' or 27n" is to be used. In the exemplary embodiment shown here, the instruction list index 24 instructs all data bus subscribers 7a, 7b, . . . , 7n to use their first instruction list, i.e., the data bus subscriber 7n also uses its first instruction list, namely instruction list 27n'. In the embodiment shown here, this instruction list 27n' shows only an instruction for the second symbol reaching this data bus subscriber 7n upon reaching the instruction list index 24, wherein this instruction is Read "R" process data 25b.

It will be appreciated by those skilled in the art that the examples of instruction lists shown herein are not intended to be limiting and any type of instruction list and any combinations of instructions may be included in the implementation of the invention without departing from the inventive idea.

The methods described herein may also be implemented as a computer readable medium including code that causes a computer to perform at least one of the described methods. The computer-readable medium can be implemented arbitrarily and provided on a carrier medium such as a DVD, CD, hard drive, or other carrier media.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating a data bus subscriber of a local bus, in particular of a ring bus, the method comprising:
    receiving a first data packet via the local bus, the first data packet being an address of the data bus subscriber to which it is directed and at least one instruction list with a set of instructions for processing process data;
    receiving a symbol of a second data packet via the local bus, the second data packet having process data;
    executing instructions of the at least one instruction list for processing the received process data symbol-by-symbol; and
    forwarding the processed symbol of the second data packet to another data bus user via the local bus and simultaneously receiving another symbol of the second data packet.

2. The method according to claim 1, wherein the first and second data packets are payload data of a cycle frame or of two cycle frames.

3. The method according to claim 1, wherein the first and second data packets comprise a plurality of symbols, each symbol having a plurality of bits.

4. The method according to claim 3, wherein receiving the first and second data packets comprises receiving the symbols of the first and second data packet symbol by symbol.

5. The method according to claim 3, wherein each symbol is processed with a fixed number of instructions of the instruction list.

6. The method according to claim 5, wherein the symbol by symbol processing of the received process data comprises bit-granular processing of the received process data.

7. The method according to claim 6, wherein the bit-granular processing comprises:
    performing a bit operation on at least one bit of the received symbol to obtain at least one processed process datum.

8. The method according to claim 1, wherein the address is a unique address used for the directed communication with the data bus subscriber.

9. A data bus subscriber of a local bus, in particular of a ring bus, the data bus subscriber comprising:
    a receiver to receive a first data packet via the local bus, wherein the first data packet contains an address of the data bus subscriber to which it is directed and at least one instruction list having a set of instructions for processing process data;
    a receiver to receive a symbol of a second data packet via the local bus, wherein the second data packet has process data; and
    an executor to execute instructions of the at least one instruction list for processing the received process data symbol-by-symbol,
    wherein the processed symbol of the second data packet is forwarded to another data bus user via the local bus and another symbol of the second data packet is simultaneously received.

10. The data bus subscriber according to claim 9, further comprising: a transmitter to send the received second data packet to another data bus subscriber via the local bus.

11. A method for operating a local bus master of a local bus, in particular of a ring bus, the method comprising:
    generating at least one instruction list with a set of instructions for processing process data for a data bus subscriber;
    generating a first data packet, wherein the first data packet comprises an address of the data bus subscriber to which the first data packet is directed, and comprises the at least an instruction list;
    generating a second data packet, the second data packet having process data;
    sending the first and second data packets to the data bus subscriber via the local bus, wherein the first and second data packets each have a plurality of symbols and the set of instructions process the process data symbol by symbol; and
    forwarding a processed symbol of the second data packet to another data bus participant via the local bus and simultaneously receiving another symbol of the second data packet.

12. The method according to claim 11, wherein each symbol has a plurality of bits, and
    wherein the first and second data packets are sent to the data bus subscriber symbol by symbol.

13. A local bus master of a local bus, in particular of a ring bus, with a data bus subscriber, the local bus master comprising:
    a generator to generate at least one instruction list with a set of instructions for processing process data for a data bus subscriber;
    a generator to generate a first data packet, wherein the first data packet has an address of the data bus subscriber to which the first data packet is directed, and has the at least one instruction list;
    a generator to generate a second data packet, the second data packet having process data; and
    a transmitter to transmit the first and second data packets to the data bus subscriber via the local bus,
    wherein the first and second data packets each have a plurality of symbols and the set of instructions process the process data symbol by symbol, and
    wherein the processed symbol of the second data packet is forwarded to another data bus user via the local bus and another symbol of the second data packet is simultaneously received.

14. A method for operating a data bus subscriber of a local bus, in particular of a ring bus, the method comprising:
    receiving, at the data bus subscriber, a first data packet via the local bus, the first data packet being an address of the data bus subscriber to which it is directed and at least one instruction list with a set of instructions for processing process data, the first data packet including no process data;

subsequently receiving a separate second data packet via the local bus, the second data packet having process data, the process data containing no address for transmitting the process data; and executing instructions of the at least one instruction list for processing the received process data, wherein the instruction list is configured for a particular data bus subscriber in the local bus and the instruction list specifies a set of rules for processing the process data of the second data packet.

15. The method according to claim 14, wherein the second data packet has a number of symbols, and wherein the method further comprises forwarding a processed symbol of the second data packet to another data bus participant via the local bus and simultaneously receiving another symbol of the second data packet.

* * * * *